United States Patent [19]

Tiraspolsky et al.

[11] 3,797,451

[45] Mar. 19, 1974

[54] WEAR WARNING DEVICE FOR ROTATING APPARATUS PROVIDED WITH AN AXIAL THRUST BEARING

[75] Inventors: Wladimir Tiraspolsky, Issy-les-Moulineaux; Roger François Rouvière, Venelles, both of France

[73] Assignee: Turboservice S.A., Issy-les-Moulineaux, France

[22] Filed: Oct. 16, 1972

[21] Appl. No.: 297,641

[30] Foreign Application Priority Data
Oct. 25, 1971 France .............................. 71.38174

[52] U.S. Cl. ............. 116/114 Q, 188/1 A, 308/1 A, 415/118
[51] Int. Cl. ............................................. G01d 21/00
[58] Field of Search ........ 116/114, 114 Q; 308/1 A, 308/108, 135, 165, 219; 188/1 A; 60/54, 55; 415/118, 196, 197

[56] References Cited
UNITED STATES PATENTS

| | | | |
|---|---|---|---|
| 1,284,701 | 11/1918 | Junggren | 308/1 A |
| 1,284,702 | 11/1918 | Junggren | 308/1 A |
| 1,316,281 | 9/1919 | Dalton | 308/1 A |
| 2,239,106 | 4/1941 | Krall | 116/114 Q |
| 3,011,566 | 12/1961 | Graham | 308/1 A X |

FOREIGN PATENTS OR APPLICATIONS

| | | | |
|---|---|---|---|
| 1,174,220 | 11/1958 | France | 116/114 Q |
| 1,157,218 | 12/1957 | France | 116/114 Q UX |
| 1,157,458 | 12/1957 | France | 116/114 Q UX |
| 1,222,715 | 1/1960 | France | 116/114 Q |

Primary Examiner—Louis J. Capozi
Attorney, Agent, or Firm—Young and Thompson

[57] ABSTRACT

A wear warning device for rotating apparatus provided with an axial thrust bearing, more particularly for drilling turbines, comprises a valve provided in the fluid circulation passages of the turbine, said valve being movable between an open position and a throttling position. A holding member is provided for normally retaining said valve in its open position. A helical spring is provided between said valve and a stationary member for urging said valve towards its throttling position. The holding member is rigid with the stator or rotor part of the turbine, while another member having an abrasive surface is connected to said rotor or stator part, respectively. The original distance between said abrasive surface and said holding member is substantially equal to the admissible wear clearance of the axial thrust bearing. When the wear limit is substantially reached, said abrasive surface cuts through said holding member in order to release said valve. Therefore, the valve is moved to its throttling position under the action of said spring and a pressure surge is transmitted to the surface as a warning signal.

9 Claims, 3 Drawing Figures

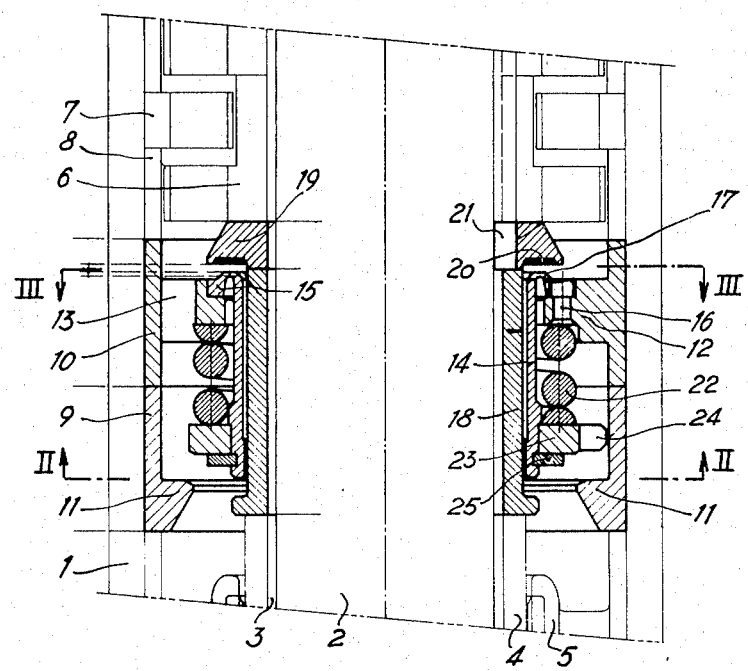
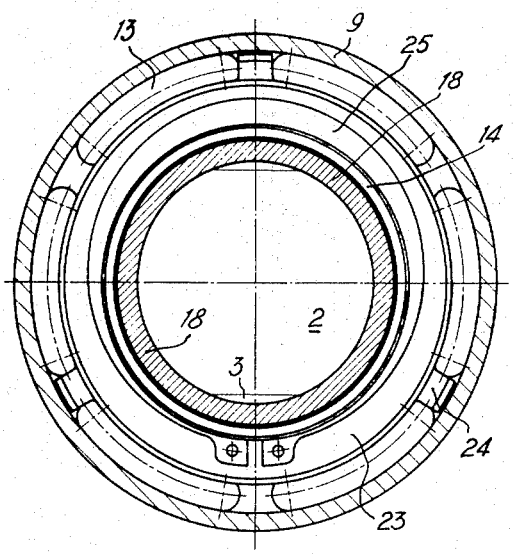
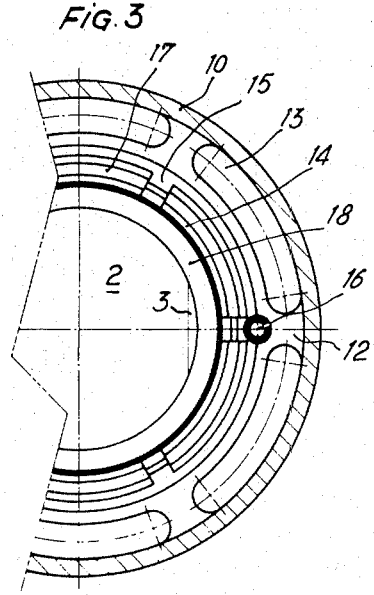

WEAR WARNING DEVICE FOR ROTATING APPARATUS PROVIDED WITH AN AXIAL THRUST BEARING

The present invention relates generally to rotating apparatus through which flows a hydraulic current and which comprise one or more axial thrust bearings.

In apparatus of this type, excessive wear of the axial thrust bearing may produce serious deterioration in the mechanical part when the axial movement resulting from the wear of the thrust bearing exceeds the magnitude of the clearance normally existing between the elements of the rotor part and the stator part of the apparatus. These elements may then come into contact, obviously producing considerable damage.

This is the case in particular in ground-drilling turbines where the thrust bearings, whether they are sliding bearings or roller bearings, may be subject to considerable axial wear, rendering doubtful the operational reliability of such apparatus at the bottom of a well.

Many solutions have already been proposed for remedying this inconvenience.

In most of these solutions, attempts have been made to brake or stop the turbine at the moment the wear exceeds the alarm level. Such devices have been described, for example, in French Pat. specifications Nos. 1,157.218 and 1.174.220.

According to another proposed solution mechanical braking is replaced by by-passing of the driving fluid on the occurrence of excessive wear of the thrust bearing. The result is a reduction in speed of the turbine through lack of power. An arrangement of this type is described in French Pat. specification No. 1.222.715.

Despite the advantages which they provided, these devices have not led to industrial applications, either owing to the complexity of the cost of their construction, or because of the technical difficulties to which their operation gives rise.

Attempts have also been made to remedy the aforesaid serious disadvantage by informing the operator at the surface, by means of an appropriate signal, that the wear alarm level has been reached. According to one proposed method, constriction of the driving fluid ducts was produced, thereby providing on the surface a significant increase in the delivery pressure. An arrangement of this kind is described in French Pat. specification No. 1.157.458. In this case, the constriction was produced by shearing one or more pins under the effect of the rotation of a disc consequent on the braking produced by the contact of two surfaces resulting from the axial displacement, due to the wear of the thrust bearing. However, in view of the fact that this wear is very gradual, there resulted a likewise gradual wear of the braking surfaces themselves, and the desired result was not obtained. Furthermore, the constriction was produced by the relative rotation of superimposed discs, which did not provide total operational reliability.

The invention relates to devices of the said latter type, ensuring constriction of driving fluid ducts for producing a signal transmitted to the surface in the form of a pressure increase, so that the operator is informed of the fact that the wear alarm level of the thrust bearing has been reached.

One object of the invention is to provide a novel device for eliminating the aforesaid inconveniences.

Another object of the invention is to provide a wear warning device adapted to be used in rotating apparatus through which passes a hydraulic current and which is provided with an axial thrust bearing, in particular in ground-drilling turbines, of the type comprising members ensuring the constriction of the fluid ducts when the wear alarm level of the axial thrust bearing is reached, wherein a valve movable axially between an open position and a closed or throttling position is arranged in the fluid ducts, means being provided for urging the said valve towards its throttling position, other means normally holding the said valve in its open position, these latter means being connected to the stator part or rotor part of the apparatus, release members connected to the rotor part or stator part of the said apparatus being arranged at an axial distance from the holding means at the most equal to the admissible wear travel of the thrust bearing, for releasing the valve by acting on the holding means at the latest when the axial thrust bearing has reached its admissible wear limit, the said valve then moving in the axial direction by the action of urging means for taking its throttling position.

The said valve may have a number of different forms, and it may consist, for example, of a disc, piston, flap or equivalent device, associated with an appropriate seat. Mounting of such a valve in the fluid ducts may also be carried out in numerous ways, which will be readily apparent to persons versed in the art, and it will be understood that the invention is by no means limited to a particular type of valve or mounting.

Urging of this valve towards its closure or throttling position may also be ensured in various ways, but a constructionally simple method is to provide at least one resilient member, for example a helical spring, urging the valve onto its seat.

The means for holding the valve in its open position advantageously comprise a supporting element resting on a stationary part and connected to the movable part of the valve, the said element being severed by the release members when the wear limit selected for the axial thrust bearing has been reached.

For releasing the valve, there is advantageously provided an abrasive surface acting on the aforesaid means when the admissible wear limit of the axial thrust bearing is approached, for severing the said holding means by abrasion and thus releasing the valve.

When the valve is released, it is displaced abruptly by an axial movement towards its closure or throttling position, constricting the cross-section of the fluid ducts, such that a significant pressure rise, of 20 to 30 bars for example, is produced at the surface. It will be understood that this signal supplied at the surface is produced as soon as the thrust bearings have reached a wear limit predetermined by the dimensioning of the axial play, in the device, between the holding means and the release members, such that the desired result is obtained. The throttling produced is thus advantageously selected so that there is still obtained a sufficient circulation of flushing fluid for the safety of the raising operation and even for terminating any important operation, it being possible to estimate the calculated risk.

The wear warning thus obtained eliminates the non-negligible risk of damaging the blades by contact in addition enables the apparatus, more particularly the drilling turbine, to be used to the limit of its wear, resulting in a considerable increase in the service lifetime of such a turbine.

The following description made with reference to the accompanying drawings, given solely by way of example, will enable the invention to be better understood. In these drawings:

FIG. 1 shows a view in axial section of a wear warning device according to one possible embodiment of the invention applied to a drilling turbine.

FIG. 2 shows a view in cross-section on the line II—II of FIG. 1 at the level of the seat of the valve.

FIG. 3 shows a view in cross-section on the line III—III of FIG. 1, at the level of the apex of the suspension shoulder of the valve.

The drawings show a device acting in the direction of suspended shaft wear, that is to say in the case where the axial thrust of the turbine rotor is greater than the reaction of the hole bottom on the drilling tool.

The turbine shown in the drawings comprises a body 1, a shaft 2 having spline flats 3, a bearing 4, 5 and sets of blades such as 6, 7 and 8 ; the axial thrust bearing, known per se, is not shown here.

The warning device according to the invention is formed of a unit inserted in the rotor and stator blade sets and occupying for example the place of two thrust bearing stages.

According to the embodiment considered here, this device comprises a stator body formed of two half-sleeves 9, 10. The half-sleeve 9 carries on its lower part a valve seat 11. The half-sleeve 10 carries on its upper part a supporting crown 12 in which are provided circulation ports 13 for the driving fluid.

The supporting crown 12 supports a sleeve 14 by means of a rupture ring 15 pinned to the crown 12 by a pin 16 connected to the seat 11 by a toroidally rounded portion 17, segmented by irrigating channels.

In the rotor assembly of the turbine stages, there are introduced a socket 18 and a grinding disc 19 provided with a circular abrasive area 20, for example provided with diamonds, and keyed at 21 to the shaft 2.

The sleeve 14 is surrounded by a helical spring 22 supported at one end on the crown 12 and at its other end on a valve 23 carrying on its periphery centring lugs 24 and supported axially by a stop ring 25.

The device just described operates as follows: When the thrust bearing (not shown) of the turbine wears, the shaft being suspended in the position shown, the abrasive area 20 gradually approaches the toroidal rounding 17 and grinds the latter. The calculation is such that when the admissible wear course of the axial thrust bearing has been substantially completed, the said toroidal rounding is completely cut through, thereby eliminating the connection between the sleeve 14 and the crown 12. Owing to the thrust of the spring 22, the said sleeve is then forced downward with the valve 23, the lugs of which come to rest on the seat 11. This throttles the passage of the driving fluid to a predetermined value, such that the corresponding rise in pressure of the circulation current attains a significant value and a signal is thus supplied to the operator.

It will be appreciated that modifications may be made in the embodiment described, in the scope of technical equivalents, without departing from the invention. Thus, by turning the device upside down and providing it with a spring calibrated for compensating, once opened, the signalling back-pressure, a seated shaft warning device is obtained. By associating or combining both devices, complete double-direction protection is obtained.

It will finally be noted that the form of signalling according to the invention is specific and may be distinguished from any other fortuitous rise in pressure, due for example to occlusion of the circuit. Thus, if the valve is closed under suspended shaft conditions, it is merely necessary to take up the clearance due to wear by increasing the weight on the tool for lifting the valve 23 by means of the socket 18 which, by means of its shoulder, moves the sleeve 14, this being disclosed in a repetitive manner by a reduction in pressure. The condition is reversed in the case of a seated shaft.

What is claimed is:

1. Wear warning device for rotating apparatus through which flows a hydraulic current and provided with an axial thrust bearing, more particularly for drilling turbines having a stator part and a rotor part and fluid circulation ducts, comprising axially movable valve means provided in said circulation ducts and movable between an open position and a throttling position, means for urging said valve means towards said throttling position, holding means for normally holding said valve means in said open position, releasing means arranged at an axial distance from said holding means at the most equal to the admissible wear clearance of said axial thrust bearing, said holding means and releasing means being connected to said rotor and stator parts respectively, such that said releasing means releases said valve means by acting on said holding means at the latest when said axial thrust bearing has reached its admissible wear limit, whereby said valve urging means moves said valve means to said throttling position.

2. Wear warning device according to claim 1, wherein said valve means comprises a duct throttling member and a seat, said throttling member being urged towards said seat by said valve urging means.

3. Wear warning device according to claim 1, wherein said means for urging said valve means towards said throttling position comprises at least one spring member.

4. Wear warning device according to claim 1, wherein said means for urging said valve means towards said throttling position comprises at least one spring member the force of which is adapted to the axial direction of movement of said valve means.

5. Wear warning device according to claim 1, wherein said means for urging said valve means towards said throttling position comprises a helical spring.

6. Wear warning device according to claim 1, wherein said valve holding means comprises a supporting member, an axially stationary element, said supporting member resting on said stationary element and being connected to said movable means, and an abrasive surface provided on said releasing means, whereby said abrasive surface cuts said supporting member when the wear limit of said axial thrust bearing has been reached in order to release said supporting member and said valve means.

7. Wear warning device for rotating apparatus through which flows a hydraulic current and provided with an axial thrust bearing, more particularly for drilling turbines having a stator part and a rotor part and fluid circulation ducts, comprising a stator member arranged in said stator part, said stator member having a seat member and a stationary supporting crown, valve means movable between an open position and a throttling position, a movable supporting member connected to said valve means and resting on said stationary supporting crown, spring means located between said valve means and stationary supporting crown and urging said valve means towards its throttling position, a rotor member arranged in said rotor part, an abrasive surface provided on said rotor member, the original distance between said abrasive surface and said supporting member being at the most equal to the admissible wear clearance of said axial thrust bearing, whereby when said axial thrust bearing wears, said abrasive surface is moved towards said supporting member and cuts said member in order to release said valve means to be moved towards its throttling position under the action of said spring means.

8. Wear warning device according to claim 7, wherein in said throttling position said valve means partially closes said seat member, whereby a pressure surge is transmitted to the surface to provide a warning signal.

9. Wear warning device according to claim 7, wherein said abrasive surface is provided with diamonds.

* * * * *